United States Patent [19]

Cristiani

[11] Patent Number: 4,558,778
[45] Date of Patent: Dec. 17, 1985

[54] TRANSFERRING DEVICE FOR ROD-LIKE ARTICLES

[75] Inventor: Athos Cristiani, Bologna, Italy
[73] Assignee: SASIB S.p.A., Bologna, Italy
[21] Appl. No.: 504,151
[22] Filed: Jun. 14, 1983
[30] Foreign Application Priority Data Jun. 23, 1982 [IT]  Italy .............................. 12573 A/82

[51] Int. Cl.$^4$ ............................................. B65G 47/86
[52] U.S. Cl. .................................. 198/471.1; 198/797
[58] Field of Search ............... 198/478, 480, 689, 377,
198/408, 797, 792; 414/225, 733, 736, 737, 744 B

[56] References Cited

U.S. PATENT DOCUMENTS

| | | | |
|---|---|---|---|
| 3,026,989 | 3/1962 | Schaltegger | 414/736 |
| 3,039,606 | 6/1962 | Dearsley | 198/478 |
| 3,303,926 | 2/1967 | Pohl | 198/478 |
| 3,521,513 | 7/1970 | Gomann et al. | 198/478 |
| 3,567,011 | 3/1971 | Pinkham | 198/478 |
| 3,952,865 | 4/1976 | Rudszinat et al. | 198/478 |
| 4,051,947 | 10/1977 | Schumacher et al. | 198/478 |
| 4,063,634 | 12/1977 | Perry | 198/478 |
| 4,408,621 | 10/1983 | Schumacher et al. | 198/478 |

Primary Examiner—Joseph E. Valenza
Attorney, Agent, or Firm—Spencer & Frank

[57] ABSTRACT

A device for sequentially transferring cigarettes or cigarette pairs from a rectilinear, preferably horizontal path, so-called "longitudinal", along which the cigarettes are moved forward in a file in which they are axially aligned, to a rotary fluted drum with its axis of rotation being parallel to the rectilinear horizontal path, the transferred cigarettes being successively deposited, parallelly arranged side by side, onto the drum in a row, which is transverse with respect to the cigarette file moving along the longitudinal path. The transferring device includes a rotary drum positively driven at a constant speed, onto which there is mounted a number of swinging arms star-like arranged at an equal distance therebetween and carrying each one a suction head for picking up and transferring the cigarettes. The drum has a number of correlated, positively reciprocating separate devices driving each the respective one of the swinging arms, as well as an equal number of like epicyclic trains, regularly arranged in a circle, which are operatively associated with the drum itself so as to evenly entrain every one of the suction heads into a motion of translation along the circular path as established by the drum for the succession of suction heads.

2 Claims, 2 Drawing Figures

TRANSFERRING DEVICE FOR ROD-LIKE ARTICLES

BACKGROUND AND SUMMARY OF THE INVENTION

The present invention relates to the devices for changing to a transverse direction the longitudinal direction of movement of rod-like articles, particularly cigarettes.

More particularly, the invention is concerned with the devices for sequentially transferring cigarettes or cigarette pairs from a rectilinear, preferably horizontal path, so-called "longitudinal", along which the cigarettes are moved forward in a file in which they are axially aligned, to a rotary fluted drum with its axis of rotation being parallel to the said rectilinear horizontal path, the transferred cigarettes being successively deposited, parallelly arranged side by side, onto said drum in a row, which is transversal with respect to the cigarette file moving along the longitudinal path.

In the known transferring devices of the kind as disclosed in the preceding paragraph, the transfer of the cigarettes from the longitudinally moving file of axially aligned cigarettes to the transversally arranged cigarette row is sequentially effected by means of pneumatic pick up or suction heads being timely moved in regular succession. The suction heads are connected with a positively driving means causing them to translate parallelly to themselves along a closed path which is operatively associated with a station for picking up the cigarettes from the cigarette file moving along the longitudinal path, as well as with a station for the delivery of the picked up cigarettes onto a movable means for supporting the transverse cigarette row, such as the said rotary fluted drum.

At the said cigarette pick up station, each one of the pneumatic pick up or suction heads will graze the cigarette file, while at the cigarette delivery station each suction head will pass tangentially to the fluted drum.

Still at the said station in which the cigarettes are picked up from the cigarette file, the suction heads are so driven by the said driving means as to skim longitudinally the said file at a tangential speed which is preferably maintained slightly higher than the speed at which the cigarette file is running; whereas, at the station in which the cigarettes are delivered, the now transversal speed of the suction heads must substantially coincide with the peripheral speed of the fluted drum.

In these known transferring devices, while a suction head is transferring one cigarette from the pick up station to the delivery station, by translating along the corresponding section of the said closed path along which the suction heads are moved, the suction head speed in the axial direction of the picked-up cigarette will gradually increase, while its speed in the transverse direction of the picked-up cigarette will correlatively increase.

In order to prevent the thus transferred cigarettes from becoming deteriorated owing to a loss of tobacco from their ends during the cigarette transfer, any acceleration and deceleration to which the cigarettes will be subjected should be reduced to the minimum possible value.

The afore-disclosed known transferring devices, such as those of the kind with an epicyclical transfer path, meet with the requirement of limiting any acceleration and deceleration as undergone by the cigarettes being transferred, so far as the axial speed at which the file of the to-be-transferred cigarettes runs, does not exceed the limit of a certain peak value that is dependant from the processing rate of the cigarette-packing machine.

However, these known transferring devices are complicated and costly in construction, and often they are even noisy, since they involve the use of epicyclic trains, sometimes also with internal gears.

A transferring device of the above kind is also known, in which the said suction heads for picking up the cigarettes from the cigarette file moving along a longitudinal path and for delivering them onto the rotary fluted drum are led to translate over an elliptical path which at one extremity of its minor axis is tangent to the file of cigarettes to be picked up, while at one extremity of its major axis it is operatively associated with the fluted drum, in correspondence of the station for the delivery of the transferred cigarettes thereonto.

By adopting such an elliptical path for the suction heads, any dynamic stress on the cigarettes, resulting from excessive acceleration and deceleration in the transfer movement of the suction heads, will be considerably reduced owing to the fact that after a cigarette has been picked up by one of the suction heads, the speed of said head in the axial direction of the picked-up cigarette will decrease very gradually along the elliptical path, while its speed in the direction perpendicular to the picked up cigarette will increase at an accordingly gradual rate.

However, in the case a very reduced spacing should have to be provided between the suction heads, the fact that the suction heads are caused to translate in succession along an eliptical path would involve certain drawbacks.

Actually, in such a case, the swinging arms carrying the suction heads must be made with an angled shape in order to prevent them from interfering with each other during their movement along an elliptical path, which complicates the construction of said arms due to the gearings that must be provided in the same for maintaining the orientation of the respective suction heads unchanged during their motion of translation.

When a transferring device of the above kind is required, in which the spacing between the swinging arms carrying the suction heads needs to be a very reduced one, it is expedient to provide a kind of transferring device in which the swinging arms are driven along a substantially circular closed path.

In a known transferring device of this kind, in which the arms carrying the suction heads are driven along a substantially circular closed path, a driving means—that is driven at a constant speed, imparts to said arms in succession a rotary motion with a periodically varying speed.

Such a periodically varying rotary motion as imparted to every one of the arms carrying one suction head, is intended for cyclically compensating the speed at which the respective suction head is translating, so as to adapt it to the cigarette pick up and delivery operations, as well as to the conditions of the cigarette transfer between the pick up and the delivery stations.

However, this kind of transferring device in which the interspaced arms carrying the suction heads are jointly moved along a constrained circular path and are each cyclically driven into a phased rotary motion at a periodically varying speed as imparted by a driving means run at a constant speed, although being theoretically possible, cannot be practically carried out because of the batch-or fan-like arrangement of said arms.

An improvement to the type of transferring device briefly disclosed in the two preceding last paragraphs, was made by providing two axially offset, equally sized parallel discs, of which one of the discs (the driving disc) entrains the driven other disc in rotation through a set of like crank-and-connecting-rod linkages regularly arranged in a circle. These linkages couple the two discs with each other in a kinematically coordinated manner, and comprise each the shaft of one respective cigarette picking up and delivering suction head, whereby the said head will be driven into a motion of translation along a circular path at the constant angular speed as dictated by the said suitably operated driving disc.

Into the common constant rate of reciprocation of the circularly arranged linkages, resulting from the crank-and-connecting-rod type connections between the two equally sized, axially offset discs, a speed adjustment factor will be periodically introduced at every revolution of said discs. The said speed adjustment factor consists in the fact that within the limits of the rotation as imparted to the linkages by the said discs, the oscillation of every one of the linkages is constrained by at least one fixed circular cam arranged concentric with at least one of the discs, and which suitably modifies the cigarette-grazing speed of the pneumatic pick up or suction head being associated to that one linkage, at the moment this very head has to pick up one cigarette from the longitudinally moving file of axially aligned cigarettes.

In the said known transferring device provided with linkages in form of cranks and connecting rods, which are driven between two axially offset discs, these linkages promote the parallel translation of the suction heads along a circular closed path, as well as the adjustment of the suction heads speed at the time these heads are picking up a cigarette from the cigarette file.

However, the said device presents a rather complicated structure, while a great accuracy is required in the construction of same. Moreover, this device is rather cumbersome, since its operation is based on axially offset discs.

The present invention proposes a sequentially transferring device with its speed being self-compensated, for changing into a transversally arranged row a file of axially aligned rod-like articles moving along a rectilinear, preferably horizontal path, so-called "longitudinal", particularly for regularly transferring onto a rotary fluted drum the cigarettes axially aligned in a file moving along the said longitudinal path. The said transferring device is provided with a number of star-like arranged arms being driven into a positive swinging motion, which respectively carry one same pneumatic pick up or suction head, and which are pivotably mounted onto a rotary drum driven into a positive rotation at a constant speed. The said drum constitutes also the planet carrier for a sun-and-plural planets motion being arranged in such a manner as to entrain in succession the said suction heads into a regular motion of translation along a substantially circular path. The said positively swinging arms are associated each to the correlated one of the positively driving reciprocating means being each operatively interlocked with one of the planets of the said sun-and-planets motion, and being cyclically driven thereby into an oscillatory motion, phased and synchronized with the circular motion of translation of the suction heads. Thus, at every revolution of the planet drum being rotated at a constant speed, a swinging motion of every suction head-carrying arm will be set over in sequence to the motion of translation of the respective suction head, so that the speed thereof will be properly modified and adapted to the cigarette pick up and delivery operations, as well as to the cigarette transfer from the pick up to the delivery station.

BRIEF DESCRIPTION OF THE DRAWINGS

These and other characteristic features of the invention and the advantages arising therefrom will appear evident in the following detailed description of one preferred embodiment thereof, made by way of a non-limiting example, and with reference to the accompanying drawings, in which.

DESCRIPTION OF THE PREFERRED EMBODIMENT

Figure 1:
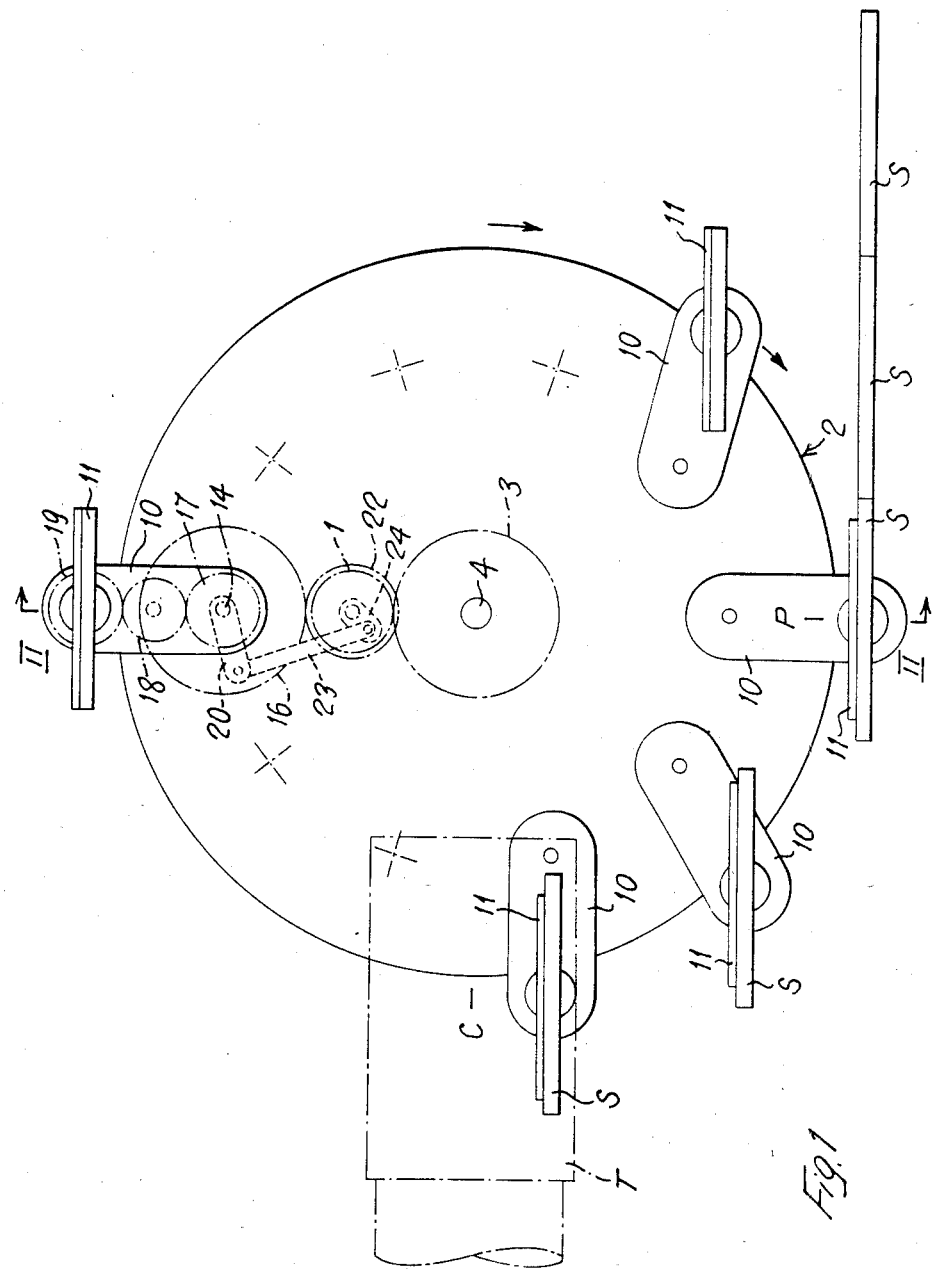
FIG. 1 is a diagrammatic part view in front elevation, showing a sequentially transferring device with its speed being self-compensated, according to the invention, for turning into a transversally arranged row a file of axially aligned rod-like articles, such as cigarettes, moving along a rectilinear, preferably horizontal path, so-called "longitudinal"
Figure 2:
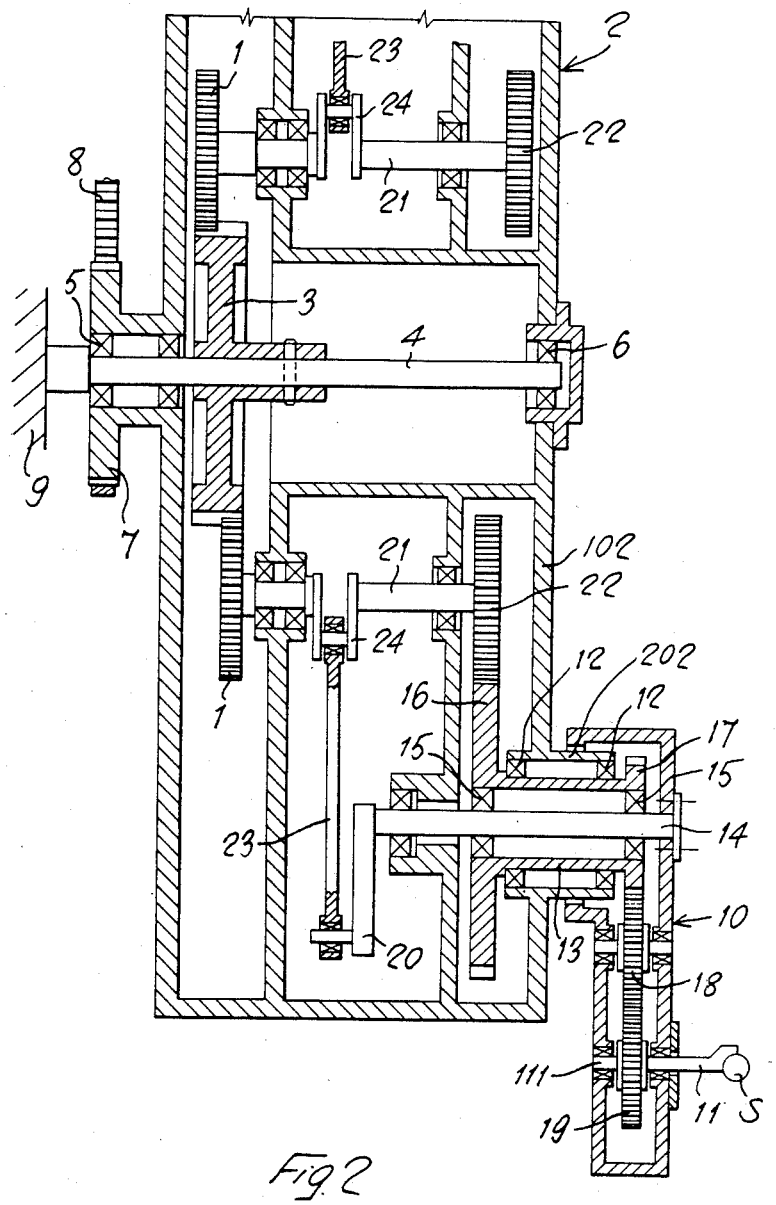
FIG. 2 is a diagrammatic part view in an enlarged scale, showing the said device according to the vertical section taken on line II—II of FIG. 1.

Referring to both of the Figures of the drawings, the shown embodiment of the sequentially transferring device of the invention, with its speed being self-compensated, is especially adapted for the purpose of sequentially transferring the cigarettes S axially aligned in a file moving along a rectilinear, preferably horizontal path, so-called "longitudinal", onto a fluted, pneumatic, rotary drum T with its axis of rotation arranged parallel to the cigarette file, so as to have the longitudinally moving file of cigarettes S turned into a row of cigarettes parallelly arranged side by side, transversely to the direction of the said longitudinally moving file.

In this embodiment of the transferring device according to the invention, a set of equally sized planet pinions 1 regularly arranged along a circle, are mounted in a planet carier in form of a drum 2 and are fitted on a stationary sun gear 3. The sun gear 3 is keyed onto the fixed shaft 4 about which the drum 2 is rotatably supported on bearings 5, 6. By constrained driving means comprising, for example, a sprocket wheel 7 and a toothed belt 8, the planet drum 2 is driven into a controlled constant rotation at a rate which is approximately correlated with the speed at which the cigarettes S are moving along the longitudinal path. The shaft of the said fluted drum is fixedly mounted onto a shoulder 9 of the immovable machine frame.

The planet drum 2 also carries a number of cigarette transferring swinging arms 10 which by one of their ends are pivotally mounted onto the front end 102 of said drum in a star-like arrangement and at an equal distance between them. Onto the free end of each one of the swinging arms 10 there is fitted a same pneumatic pick up or suction head 11, the said suction heads 11 being provided for picking up in succession the cigarette S each time heading the cigarette file, and for transferring same into the corresponding consecutive flute in the rotary fluted drum T, where the successive cigarettes S being fed thereto from the longitudinally moving file, will be transversally arranged side by side in a row.

The planet drum 2 carrying the said sun-and-planet motion extrains in succession the suction heads 11 into a regular motion of translation along a circular operative path which at the cigarette pick up station P is associated with the oncoming file of cigarettes S, while at the cigarette delivery station C it is associated with the cigarette-receiving fluted drum T.

By its end which is opposite to the end supporting the respective suction head 11, each arm 10 is fitted onto a bush 202 provided at the front end 102 of the planet drum 2 onto which the said arms are mounted in a star-like arrangement.

Within each bush 202 of the planet drum 2 there is fitted a pair of bearings 12 on which a tubular shaft 13 is supported, and in turn the said shaft 13 supports a co-axial spindle 14, which is mounted in the tubular shaft 13 through the interposition of bearings 15.

The tubular shaft 13 so supported on bearings 12, extends into the planet drum 2 by its one end onto which there is mounted the regression gear wheel 16 suitably connected to the sun-and-planet-motion driving the pneumatic pick up or suction heads 11 into a motion of translation along a circular path, while the said shaft 13 extends as far as into the hollow interior of the respective swinging arm 10 by its other end onto which there is mounted the input gear wheel 17 driving the three gear wheel train 17, 18, 19 with a unitary gear ratio. The said train of gear wheels 17, 18, 19 governs the mandrel 111 of the respective suction head 11 picking up and transferring one cigarette S at a time from the longitudinally moving file onto the rotary fluted drum T, regularly receiving the thus transferred cigarettes into its successive pneumatic flutes.

Also the spindle 14, which is co-axially mounted in the tubular shaft 13, extends into the rotary planet drum 2 by its one end fitted with a link rod 20, while the other end of said spindle has a swinging arm 10 keyed thereonto, whereby it forms the axis upon which the said arm swings.

In the interior of the planet drum 2, the gear wheel 16 which through the tubular shaft 13 drives the three unitary gear wheels 17, 18, 19 connected to one of the suction heads 11, is operated by the respective planet pinion 1, through its shaft 21 carrying the gear wheel 22 which is in mesh with the gear wheel 16.

According to one characteristic feature of the invention, it is provided for the pair of gear wheels 22, 16 to have a gear ratio which is equal and contrary to the gear ratio of each planet pinion 1 with respect to the stationary common sun gear 3. Owing to the mere connection of each one of the suction heads 11 to the respective planet pinion 1 through the three gear wheel train 17, 18, 19 with a unitary gear ratio and the relative pair of reversing gears 22, 16, each suction head 11 will be then simply caused, while the planet drum 2 is being driven into a positively controlled rotation, to translate according to the circular path as dictated by the drum 2, along which every suction head will be maintained always parallel to itself.

However, with the suction heads 11 being only driven into a circular motion of translation, the sequential transfer of the cigarettes from the longitudinally moving file to the transversally arranged cigarette row in the course of being formed on the rotary fluted drum T, will occur under a condition of unadapted speeds, both at the pick up and the delivery station. In fact, at the pick up station, the cigarettes to be transferred to the delivery station must be picked up by the suction heads 11 sequentially and tangentially tto the file S, with a slight excess in the speed of the suction head on duty skimming therealong, with respect to the forward movement of the file itself. Whereas, in the delivery station, at the time the cigarettes are being delivered into the respective pneumatic flutes in drum T, the sequential delivery of the cigarettes to said drum by the suction heads must occur under a condition of the cigarette axial speed being substantially at zero value, since the cigarette row being orderly and gradually formed on the cigarette-receiving fluted drum T extends at right angles to the longitudinally moving file S.

The present invention provides for the required adaptation of the translational speed of the suction heads 11 forming part of the transferring device as disclosed herein, both at the pick up and the delivery station. Accordingly, it provides for a phased, positive, alternate swinging motion of each one of the swinging arms 10 carrying one respective suction head 11, to be cyclically set over the above-disclosed constrained circular motion of translation of every one of the suction heads 11 in turn. This cyclic alternate swinging motion as imposed on each one of the swinging arms 10, is suitably synchronized and phased with the successive translation of the suction heads 11. The provision of the said swinging motion of arms 10 is such that the peripheral speed at which every swinging arm 10 swings when its associated suction head 11 is passing by the pick up station P, to pick up one cigarette from the longitudinally moving file S, will be added linearly to the translational speed of this very head being entrained along a closed path over the rotary drum 2. The speed at which the said suction head 11 grazes the file S will be then substantially equal to, but preferably slightly higher than, the speed of the cigarettes in the longitudinally moving file. Whereas, at the moment the cigarette picked up and transferred by the suction head 11 is being delivered, at the delivery station C, into one flute of the rotary fluted drum T, on which an orderly row of cigarettes arranged substantially at right angles to the file S is being continuously composed, the respective swinging arm 10 just passes through the point of reversal of its oscillation. Thus, the suction head 11 being caused to translate by this arm 10 can be regularly associated, in the required position and at the required speed, with the corresponding cigarette-receiving flute just passing by the delivery station C, so that the cigarette picked up and transferred by said head will be delivered into said flute.

According to the invention, such a positive swinging motion will be cyclically imparted in a regular sequence and in phase to each one of the said star-like arranged swinging arms 10 in turn, due to the fact that through a connecting rod 23 every link rod 20, which is integral with the respective spindle 14 onto which one of arms 10 is swingably mounted, is periodically driven into an alternate full swinging motion, like a balance arm, by an associated respective crank 24 which is carried by the shaft 21 of the correlated planet pinion 1, which in turn is kinematically connected to the mandrel 111 of the suction head 11 associated to that one swinging arm 10, by means of the relative pair of regression gears 22, 16, and the corresponding train with a unitary gear ratio of the three repeating gears 17, 18, 19 connected to the sun-and-planet motion for the translation of that suction head 11.

Of course, every balance arm 20 will be made with a suitable length which will be greater than that of the respective crank 24, depending upon the required swinging motion of each one of the star-like arranged swinging arms 10.

Within the planet drum 2, the crank 24 of each drive mechanism 20, 23, 24 entraining into an alternate positive swinging motion the associated swinging arm 10, is mounted, as disclosed, onto the shaft 21 of the respective planet pinion 1-that together with the other planet pinions 1 drives the epiciclic train promoting the circular translation of every one of the suction heads respectively associated to one of the swinging arms 10, star-like arranged on, and carried by, drum 2. Such an arrangement is a simple, reliable, and durable means for assuringg the regular operation in the required synchronized and phased relation of the sequentially transferring device for turning into a transversally arranged row a longitudinally moving file of axially aligned rod-like articles, with its speed being self-compensated, according to the invention.

Of course the invention is not limited to the embodiment just described and shown by way of an example, but it may by widely changed and modified, the more so in connection with the particular and specific requirements of each single case in the art, without however departing from the widest scope of the leading principle of the invention, as set forth hereinabove, and as claimed hereinafter.

What I claim is:

1. A cyclic, sequentially transferring device for gradually turning a moving file of axially aligned rod-like articles located at a pick-up station into a uniform row of said articles arranged parallel to each other at a delivery station having a rotating drum, the drum having an axis that is substantially parallel to the axes of the articles at the pick up station, comprising:
   a rotary carrier positively driven at a constant speed;
   a number of swinging arms movably mounted on said carrier in a star-like arrangement at equal distances therebetween;
   a plurality of mandrels, each mandrel being rotatably mounted on a respective swinging arm;
   a suction head carried by each arm for picking up and transferring the articles, each suction head being mounted on a respective mandrel and having an axis;
   a number of correlated, positively reciprocating separate means driving each a respective one of the swinging arms by oscillating the respective swinging arm back and forth with respect to said carrier; and
   an equal number of like epicyclic trains which are operatively associated with the carrier itself so as to evenly entrain every one of the suction heads into motion along a path, established by said carrier as it rotates and arms as they oscillate, while maintaining the axes of said suction heads parallel to the axes of the articles at the pick-up station, said epicyclic trains including planet pinions rotatably mounted on said carrier and arranged in a circle, and a sun gear mounted on a fixed shaft, said planet pinions meshing with said sun gear and said carrier rotating about said fixed shaft,
   wherein each epicyclic train further includes an additional shaft rotatably mounted on said carrier, one of said planet pinions being mounted onto said additional shaft, a gear train with a unitary gear ratio, said gear train including three position-repeating gears, one of which is connected to a mandrel, and a transmission gearing through which the gear train is linked to said additional shaft, said transmission gearing having a pair of unitary regression gears with a ratio equal and contrary to that of the planet pinion with respect to the sun gear, whereby each suction head is driven, independently from the oscillatory movement of its own swinging arm, and
   wherein each one of the said positively reciprocating means driving each a respective one of the swinging arms includes a spindle onto which that one swinging arm is swingably mounted, a balance arm for driving the spindle, and a crank carried by one of said additional shafts, said crank driving said balance arm, whereby the oscillatory movement of each one of the swinging arms will be cyclically and operatively synchronized also in amplitude and phase with the movement of the associated suction head, the said spindle being co-axially mounted in a tubular shaft which connects the pair of unitary regression gear wheels to the gear train.

2. A device for transferring a rod-like article from a first station where the article moves axially to a second station where the article moves sideways, said second station having a rotating drum to receive the article, comprising:
   a carrier having a periphery and having a front wall with a bushing near the periphery;
   a sun gear fixedly mounted within the carrier;
   means for rotating the carrier with respect to the sun gear;
   a swing arm movably mounted on the bushing;
   a mandrel rotatably mounted on the swing arm;
   a suction head mounted on the mandrel, said suction head having an axis;
   a shaft rotatably mounted in said carrier;
   a planet gear affixed to said shaft, said planet gear meshing with said sun gear;
   swinging means linking said shaft to said swing arm for oscillating said swing arm back and forth with respect to said carrier, said swinging means including
      a spindle rotatably extending through said bushing, said spindle having an inside end disposed within said carrier and an outside and that is affixed to said swing arm,
      a link rod affixed to the inside end of said spindle,
      a crank affixed to said shaft, and
      a connecting rod having a first end movably joined to said crank and a second end movably joined to said link rod; and
   alignment means, linking said shaft to said mandrel and cooperating with said swingingg means, for keeping the axis of said suction head parallel to the axis of an article at said first station, said alignment means including
      a tube rotatably extending through said front wall and bushing, said tube having an inside end which is disposed within said carrier and an outside end which is disposed within said swing arm,
      first transmission means linking the inside end of said tube to said shaft for rotating said tube when said planet gear rotates, said first transmission means including a first gear affixed to said shaft and a second gear affixed to the inside end of said tube, said first gear meshing with said second gear, and second transmission means linking the outside end of said tube to said mandrel for rotating said mandrel when said tube rotates, said second transmission means including a third gear affixed to the outside end of said tube, a fourth gear journaled for rotation within said swing arm and meshing with said third gear, and a fifth gear affixed to said mandrel and meshing with said fourth gear.

* * * * *